United States Patent [19]

Blackburn

[11] Patent Number: 5,035,941
[45] Date of Patent: Jul. 30, 1991

[54] ANTI-STATIC MULTILAYER LAMINATE COMPRISING A NON-WOVEN LAYER EXTRUSION COATED WITH POLYMERIC LAMINAE, AND METHOD OF MAKING THE SAME

[75] Inventor: William A. Blackburn, Madison, Ala.

[73] Assignee: Abandaco, Inc., Manhasset, N.Y.

[21] Appl. No.: 396,855

[22] Filed: Aug. 22, 1989

[51] Int. Cl.$^5$ .............. A62B 17/00; B32B 27/08; B32B 27/18; B32B 31/30; B32B 33/00
[52] U.S. Cl. ................ 428/286; 2/2; 2/84; 156/244.11; 156/244.23; 156/336; 428/287; 428/516; 525/240
[58] Field of Search .......... 2/2; 428/286, 287, 516, 428/336; 156/244.11, 244.23; 525/240

[56] References Cited

U.S. PATENT DOCUMENTS

| | | | |
|---|---|---|---|
| 4,339,507 | 7/1982 | Kurtz et al. | 525/240 |
| 4,587,175 | 5/1986 | Akao | 428/458 |
| 4,590,126 | 5/1986 | Andersson | 428/458 |
| 4,592,941 | 6/1986 | Emmons | 428/113 |
| 4,677,696 | 7/1987 | Tanake | 2/84 |

OTHER PUBLICATIONS

"Anti-Static Agents," Modern Plastics Encyclopedia 1986-1987, p. 117 (by J. D. Van Drumpt), pp. 655-657.
"Abanda ® Limited Use Protective Clothing for Industry," 1984 Product Brochure of Disposables, Inc. (Manhasset, N.Y.), pp. 13 & 14.

Primary Examiner—James C. Cannon
Attorney, Agent, or Firm—Olive & Olive

[57] ABSTRACT

A multilayer laminate comprising: (a) a substrate layer of fibrous material; (b) an intermediate layer of polymeric material which is free of anti-static material and is extrusion laminated to the substrate layer; and (c) an outer layer of polyethylene containing anti-static material and including low density polyethylene and linear low density polyethylene, which is coextruded with and extrusion laminated to the intermediate layer. Also disclosed is an appertaining process for making a multilayer laminate. The laminate of the invention has particular utility in the fabrication of protective garment articles, for use in applications involving exposure to flammable or explosive environmental constituents which are susceptible to ignition by static discharge.

20 Claims, 1 Drawing Sheet

ANTI-STATIC MULTILAYER LAMINATE COMPRISING A NON-WOVEN LAYER EXTRUSION COATED WITH POLYMERIC LAMINAE, AND METHOD OF MAKING THE SAME

BACKGROUND OF THE INVENTION

1. Field of the Invention

This invention relates to multilayer laminate materials having an anti-static character and suitable for protective apparel applications, as well as to a method for making such multilayer laminate materials.

2. Description of the Related Art

Protective apparel is utilized in a wide variety of applications for protection of the body against environmental contaminants and conditions, including protection from toxins and other materials which are deleterious or undesirable in contact with, or exposure to, the body.

In a number of application areas, it is required that the protective apparel articles have anti-static characteristics, in order to be safely employed for their intended purpose. Examples include spray painting assembly lines, laboratories, and the like, where volatile, flammable, or combustible materials are present in the work environment, and may be ignited by discharges of static charge which is built up in the bodies of workers in such environments. Thus, in order to preclude or at least minimize the possibility of fire and/or explosion in circumstances where volatile solvents, combustible anesthetic gases and the like, are present, which are latently susceptible to ignition from static discharges, the protective apparel desirably is fabricated of a material which is anti-static in character.

Unfortunately, however, most materials used to fabricate protective apparel, such as natural and synthetic woven and non-woven materials, and polymeric sheet and film materials, have a significant susceptibility to static charge build-up in use.

In the field of protective apparel, much effort is focused on developing improved protective garments which cover the body of the wearer and afford protection against liquid penetration, as a "splash barrier" in instances where liquids of a toxic or hazardous character are being handled, where liquid clean-up is required, and/or where protection from liquid contact with the body of the garment wearer is reqired. A variety of laminated materials have come into usage for such protective apparel applications. In these applications, the body side layer of the laminate may be a non-woven or other fibrous material web having good textural or "hand" characteristics, while the external layer(s) may comprise polymeric films to impart liquid penetration resistance to the overall material. As indicated above, these fibrous web and polymeric film(s) component materials are highly susceptible to static charge build-up. Such susceptibility is a major problem in garment articles formed from laminates of these materials, and this problem has not been satisfactorily solved.

Accordingly, it is an object of the present invention to provide a multilayer laminate material which is suitable for use in applications such as the fabrication of protective garments and apparel items, and which has a high level of resistance to static charge build-up.

It is another object of the invention to provide a method of making a multilayer laminate of such type.

Other objects and advantages of the invention will be more fully apparent from the ensuing disclosure and appended claims.

SUMMARY OF THE INVENTION

The present invention relates to a multilayer laminate having resistance to static charge build-up therein, comprising:

(a) a substrate layer of non-woven material;

(b) an intermediate layer of polymeric material which is free of anti-static material and which is extrusion laminated to the substrate layer; and (c) an outer layer of polyethylene which contains an anti-static material and comprises low density polyethylene and linear low density polyethylene, and which is co-extruded with and extrusion laminated to the intermediate layer of polymeric material.

As used herein, the term "intermediate layer" is intended to be broadly construed to include a unitary layer of a single-composition, as well as a middle portion of the laminate comprising plural sub-layers or regions, having the same or different compositions. Preferably, the intermediate layer is a unitary layer of a single-type material, such as a polymer, copolymer, or a mixture, blend, or composite thereof.

The term "low density polyethylene" means a homopolymer of ethylene having a random crystalline structure and a density of from about 0.910 to about 0.925 grams per cubic centimeter.

The term "linear low density polyethylene" means a homopolymer of ethylene having a predominantly linear crystalline structure and a density of from about 0.916 to about 0.930 grams per cubic centimeter.

In another aspect, the present invention relates to a process for making a multilayer laminate having resistance to static charge build-up, comprising:

providing a substrate layer of non-woven material;

coextruding from separate feed source polymeric materials, and extrusion laminating with the substrate layer, (1) an intermediate polymeric layer, and (2) an outer polyethylene layer comprising low density polyethylene and linear low density polyethylene; and incorporating in the feed source polymeric material for the outer polyethylene layer an anti-static material, while maintaining the feed source polymeric material for the intermediate layer substantially free of anti-static material.

In a further aspect, the invention relates to a garment article comprising a multilayer laminate material as broadly described hereinabove.

Other aspects and features of the present invention will be more fully apparent from the ensuing disclosure and appended claims.

DETAILED DESCRIPTION OF THE INVENTION, AND PREFERRED EMBODIMENTS THEREOF

Figure 1:
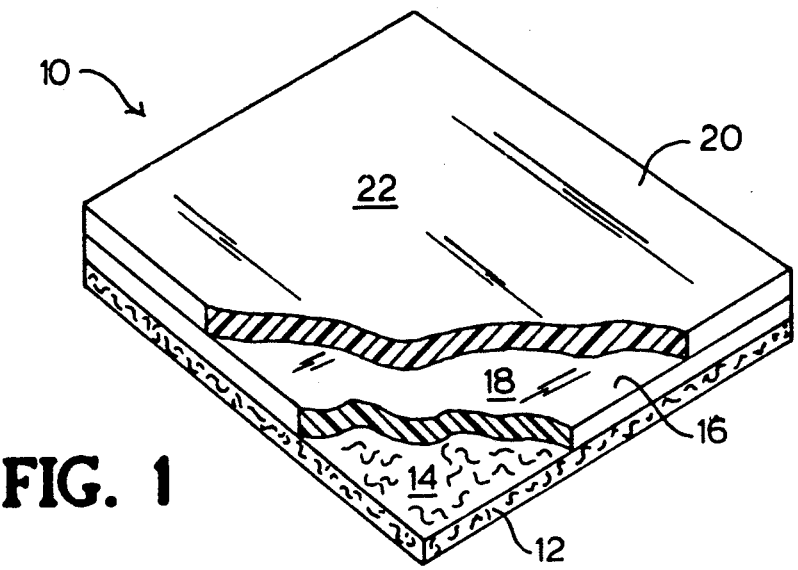
FIG. 1 is a perspective view of a multilayer laminate according to one embodiment of the present invention, partially broken away to show the constituent laminae thereof.

The present invention is based on the surprising and unexpected discovery that a delamination-resistant, antistatic multilayer laminate may be formed of a fibrous web substrate to which is extrusion laminated polymeric material layers containing an anti-static material in an outer extrusion laminated layer, wherein the polymeric material layers are substantially pinhole-free. In this laminate, the antistatic material does not cause delamination of the polymeric material layers from the fibrous substrate layer, even when the laminate is subjected to repeated launderings, such as have resulted in delamination failure of previously tested fibrous web/polymeric film laminates in which the polymeric film contains an anti-static component.

The surprising and unexpected advantages of the present invention are attributable to (1) the provision of an outer polyethylene layer in the multilayer laminate which comprises as the polyethylene constituent a blend of low density polyethylene (LDPE) and linear low density polyethylene (LLDPE), together with (2) the provision of an intermediate polymeric material layer between the outer polyethylene layer and the fibrous substrate layer, which is substantially free of anti-static material content.

In contrast to the excellent delamination resistance of the multilayer laminate of the invention, and the substantially pinhole-free character of the polymeric layers therein, the extrusion lamination of polymeric films such as LDPE containing an anti-static additive directly to a fibrous substrate results in significant delamination, and the polymeric extruded film is characterized by the presence of randomly distibuted pinholes therein which render the laminate wholly unsuitable for use in protective apparel applications.

More specifically, in laminate structures comprising a fibrous substrate to which is directly extrusion laminated a polymeric film containing an anti-static additive, the delamination of the film and fabric layers generally occurs well after fabrication. The properties of such laminate product appear satisfactory at the time of its manufacture, however, significant deterioration of the film/fabric bond occurs with time, particularly in instances where the laminate is subjected to widely varying temperature and/or relative humidity conditions, and most pronouncedly when the laminate as part of a protective garment is laundered for reuse.

This delamination phenomenon poses a significant problem in terms of inability to determine at the time of manufacture whether the laminate will perform satisfactorily in subsequent use without the occurrence of delamination.

In response to this problem, a delamination test procedure, the Blackburn Delamination Test, was developed, as subsequently described in Example I hereof. By this procedure, the pressure level required to hydraulically separate the film from the fabric is measured, as a means of quantitating the delamination susceptibility of the fabric at a given point in time.

By means of this test procedure and accelerated aging of fiber/film laminate samples, it was determined that Blackburn Delamination Test pressure values of at least 7 psi are characteristic of film/fabric laminates having suitable delamination resistance for commercial applications. Laminates characterized by good adhesion between the constituent film and fabric layers have a Blackburn Delamination Test pressure characteristic which may be as high as 20 psi or even higher. For film/fabric laminates characterized by poor adhesion, the Blackburn Delamination Test pressure characteristic frequently is less than 1 psi.

Interestingly, this delamination test work indicated a correlation between laundering properties of the film/fabric laminate, and its susceptibility to delamination. In instances where Blackburn Delamination Test pressure values were less than 7 psi, the laminate, as employed to form a protective garment article, readily delaminated when washed in a conventional washing machine as part of a 12 pound dummy wash load.

With the development of the Blackburn Delamination Test, the problem of film/fabric delamination was evaluated with respect to the effect of numerous variables on adhesion and the delamination properties of the constituent film and fiber layers of the laminate. This evaluation effort revealed that the loss of adhesion and resulting delamination was due to the influence on the film/fabric interfacial bond, of the antistatic agent in the polymeric film.

Specifically, the anti-static agent was found to migrate within the polymeric film, and, if allowed to migrate to the film/fabric interface, resulted in delamination. Thus, a film/fabric laminate product with apparently excellent delamination resistance at the time of manufacture could within a very short time, e.g., within 30 days of storage under ambient conditions, become a totally unsuitable product due to delamination.

In the laminate of the present invention, such detrimental effect of the anti-static agent on film/fabric interlayer adhesion is wholly overcome, by coextrusion of polymeric films and extrusion lamination of the coextrudate to a fibrous substrate, wherein only the outer (uppermost) layer of the coextrudate contains an anti-static agent. The intermediate coextruded film layer is substantially free, and preferably essentially completely free, of anti-static material content.

In such manner, the intermediate layer, being free of anti-static component, provides a barrier layer which blocks migration of the anti-static component to the film/fabric interface. Further, it has been found that the anti-static component surprisingly is more efficient when localized in such outer layer of the laminate than when homogeneously dispersed throughout the entire film structure laminated to the fibrous substrate.

It was also determined from evaluation studies that in film/fabric laminates in which polymeric films of materials such as LDPE were extrusion laminated to fibrous substrates such as spunbonded polypropylene, unacceptable pinholing of the polymeric film was invariably present.

Further study of this problem indicated that the randomly generated pinholes in the polymeric film were the result of small fibers extending generally vertically from the plane of the fibrous substrate, which ruptured the film and produced the observed pinholes.

Various approaches for overcoming such deleterious pinholing of the applied polymeric film were tested, including cutting of the protruding filaments with a hot, resistanceheated metal ribbon to obtain a fabric surface free of protruding fibers. While feasible, this approach requires the provision of additional equipment in the fabrication process as well as close control of the position of the heated metal ribbon relative to the surface of the fibrous web, particularly since the fibrous web may be of varying thicknesses in commercial film/fabric laminating operations.

Another approach that was investigated involved thermally calendering the surface of the fibrous substrate to press the filaments (protruding fibers) back into the plane of the fabric. This approach, while also successful, entails the disadvantages of requiring additional capital equipment and heat energy in the laminating process system.

In accordance with the present invention, a further approach has been successfully employed to overcome such pinholing problem, involving the use of a blend of LDPE and LLDPE as the polymer material for the outer film layer of the laminate. Suprisingly, this LDPE/LLDPE composition as the outer film material has been found to overcome the pinholing problem. While it is not desired to be bound by any theory or mechanism as regards to the achievement of the substantially pinhole-free character of the outer polymeric film layer of the multilayer laminate when the LDPE/LLDPE blend is used as the material of construction, it appears that the LLDPE may function in the LDPE to eliminate pinholing, by increasing the film strength and resistance to penetration.

Thus, the laminate of the present invention comprises a multilayer material whose inner (substrate) layer is a fibrous web. The base layer is desirably employed as a body side layer of the laminate, when the laminate is used in garment and apparel applications. The extrusion laminated polymeric film portion of the laminate comprises an outer layer formed of an LDPE/LLDPE blend material containing an anti-static component and containing LLDPE in a sufficient amount to substantially completely eliminate pinhole formation in the polymeric film portion of the laminate. Interposed between the outer polymeric film layer and the fibrous substrate layer is a polymeric interlayer which is substantially free of anti-static material content.

The fibrous substrate employed in the laminate of the present invention may suitably comprise any natural or synthetic material, woven or non-woven in character. In general, non-woven materials are preferred for the substrate layer.

Non-woven substrate layers may be formed of any of a wide variety of non-woven web forming techniques, including those of carding and binding, thermal bonding, hydroentanglement, spunlacing, needlepunching, stitchbonding, spunbonding, meltblowing, wet forming, airlaid pulp forming, and combinations of the aforementioned techniques.

The fibers which may be utilized in forming such non-woven substrate layers include rayon, polyethylene-terphthalate, polypropylene, wood pulp, cotton, nylon, and various other natural and synthetic fiber materials, including blends and composites containing such materials.

In some instances, depending on the fiber type and forming method, it may be advantageous to utilize in the non-woven substrate layer a binder, such as for example latexes, low melt fibers, powders, bicomponent fibers, resins, etc., as well as to utilize physical techniques for increasing the structural integrity of the non-woven matrix, such as thermal pattern bonding in the case of non-woven webs formed of thermoplastic or thermosetting materials.

A preferred non-woven material is polypropylene, and suitable commercially available polypropylene non-woven web products include the spunbonded polypropylene web materials marketed under the trademarks POLY-BOND ® (Wayne-Tex Corporation, Waynesboro, Va.), CELESTRA ® James River Corporation, Richmond, Va.), and EVOLUTION=(Kimberly-Clark Corporation, Neenah, Wis.).

The polymeric material utilized to form the intermediate layer which is extrusion laminated directly (contiguously) to the fibrous substrate may be any suitable polymeric material which is amenable to thin film formation and lamination to the substrate, and which achieves sufficient interlayer film/substrate bonding strength so that the laminate retains its structural integrity in use without separation of the polymeric film from the substrate web. In general, olefinic polymers and copolymers are preferred, although various other polymers and copolymers may usefully be employed. Among the preferred olefinic polymeric materials are LDPE, ethylene vinyl alcohol polymers and copolymers, and ethylene vinyl acetate polymers and copolymers. Among such preferred olefinic polymeric materials, LDPE generally is most preferred.

In general, the intermediate polymeric material layer of the laminate of the present invention may be employed at any suitable film thickness providing the desired barrier resistance properties to migration of anti-static material from the outer polymeric film layer of the laminate to the intermediate polymeric film/substrate interface, and which is compatible with the use environment of the laminate material. For example, when the laminate is used in protective apparel applications, the laminate material must accommodate bodily movement and associated flexural, compressive, and tensile stresses. In general, it is satisfactory to employ thicknesses for the intermediate polymeric film which are on the order of from about 0.3 mil to about 1 mil, with preferred thicknesses generally being on the order of from about 0.5 to about 0.8 mil. As an example, when LDPE/LLDPE blends are employed to form the intermediate polymeric layer in the laminate, thicknesses on the order of from about 0.6 to about 0.7 mil are generally satisfactory.

When the intermediate film layer in the laminate is formed of polyethylene, the composition preferably comprises a blend of LDPE and LLDPE, in which the LLDPE is present in sufficient amount to substantially completely eliminate pinhole formation resulting from piercing of the film by upstanding fibers from the fibrous substrate (in combination with the outer polymeric film layer of the laminate).

For such purpose, the polyethylene blend may suitably contain from about 5 to about 50% of LLDPE, based on the total weight of LLDPE and LDPE in the film. Preferably, the amount of LLDPE in such blend is from about 10 to about 30% by weight, on the same total weight basis, and most preferably the amount of LLDPE in such blend is from about 10 to about 25% by weight, on the same total weight basis.

The outer polymeric film layer in the laminate of the present invention desirably comprises a polyethlene blend of LDPE and LLDPE wherein the respective polyethylene components in the blend are present in sufficient relative amounts to substantially completely eliminate pinhole formation in the polymeric film portion of the laminate, in combination with the previously described intermediate polymeric film layer. Thus, the outer polymeric film layer of the laminate may be formed of LLDPE/LDPE blends with the same composition as the intermediate polymeric film layer of the laminate. Correspondingly, the outer polymeric film may be provided in thicknesses which are generally the same as those of the intermediate polymeric film layer of the laminate.

It is a critical feature of the present invention that the intermediate polymeric film layer is free of any significant anti-static materials, and that only the outer polymeric film layer in the laminate contains anti-static material.

The anti-static material employed in the outer polymeric film layer of the laminate may comprise any suitable material which is compatible with the outer polymeric film and provides the laminate with the desired resistance to anti-static charge build-up. Examples of anti-static materials which may potentially be useful in the broad practice of the present invention include cationic, anionic, and nonionic antistatic additives; various specific potentially useful materials are described and listed in *Modern Plastics Encyclopedia* 1986–1987, pp. 117 and 655–657, the disclosure of which hereby is incorporated herein by reference. In general, Ampact 10053 is a suitable material and has been usefully employed in laminates wherein the intermediate polymeric film layer is of the same polyethylene composition as the outer film layer of the laminate.

The anti-static material utilized in the outer film layer of the laminate may be employed at any suitable concentration. In general, concentrations on the order from about 2% to about 4% of anti-static component by weight of the polymeric film material are usefully employed.

Referring now to the drawings, FIG. 1 shows a perspective view of a multilayer laminate according to one embodiment of the present invention, wherein the upper laminae are partially broken away to show the overall construction of the laminate.

The laminate 10 as shown comprises a lower or base substrate fibrous layer 12, to the main top surface 14 of which is coextrusion laminated polymeric film layers 16 and 20, with the intermediate polymeric film layer 16 being contigously extrusion laminated to the main top surface 14 of the fibrous substrate 12. Coextrusion laminated with the intermediate polymeric layer 16 is the outer polymeric film 20 which is contiguously laminated to the main top surface 18 of the intermediate layer in the laminate. The main top surface 22 of the outer polymeric film layer 20 thus defines an exterior surface of the laminate, when the laminate is employed in protective garment applications, with the fibrous substrate layer 12 as a body side layer of the laminate.

In this laminate, anti-static material is dispersed, preferably homogeneously, throughout the outer polymeric film layer 20. The intermediate polymeric film layer 16 is substantially free of anti-static material content, being preferably essentially completely free of any anti-static constituents.

In this laminate the outer polymeric film layer 20 suitably comprises a polyethylene composition of LDPE and LLDPE, which in conjunction with the intermediate polymeric film layer 16 serves to prevent fibers from the fibrous substrate layer 12 from penetrating the polymeric film portion of the laminate and causing pinholing thereof. Further, the intermediate polymeric film layer 16, being substantially free of anti-static material content, functions as a barrier layer to prevent migration of anti-static material in the outer polymeric film layer 20 from migrating to the interface between fibrous substrate layer 12 and intermediate polymeric film layer 16.

Figure 2:
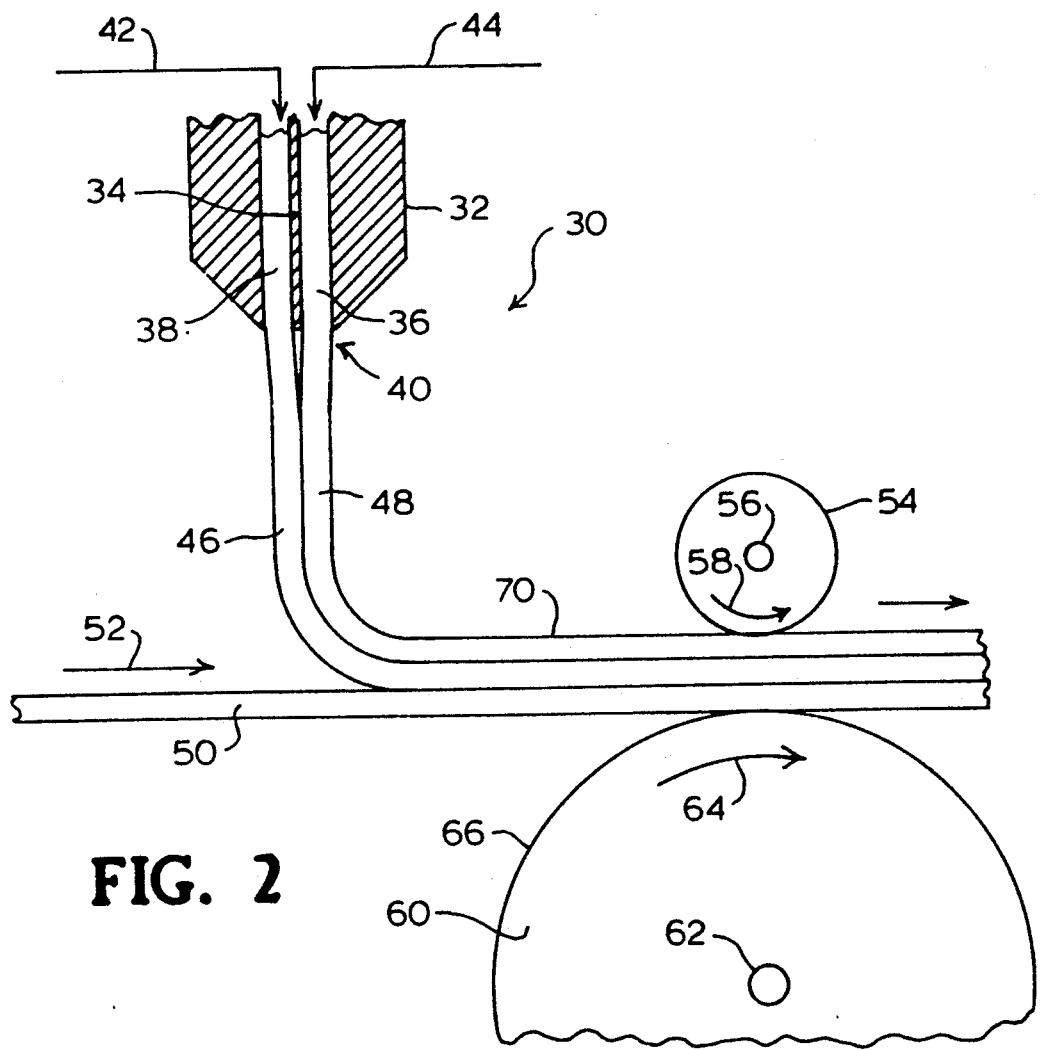
FIG. 2 is a schematic representation of a process system for making a multilayer laminate material according to one embodiment of the present invention.

FIG. 2 is a schematic representation of a process system such as may be advantageously employed to form the multilayer laminate of the present invention.

As shown, the process system 30 comprises a coextrusion die 32 whose central passage is divided by a partition 34 into adjacent coextrusion passages 36 and 38. Coextrusion passage 36 is fed with polymeric material in melt form from feed conduit 44. Correspondingly, coextrusion passage 38 is concurrently feed with polymeric feed material from feed conduit 42.

In this manner, the respective polymeric feed materials in coextrusion passages 36 and 38 of the extrusion head 32 are discharged at the coextrusion head nozzle 40 and form a coextruded melt "ribbon," comprising the outer film 48 derived from the feed source polymer delivered to the coextruder in conduit 44, and an intermediate film 46 deriving from feed source material delivered to the coextruder in conduit 42.

The dual layer ribbon of coextruded material then is laid down as illustrated on a fibrous substrate web 50 which is translated beneath the coextruder in a generally horizontal direction indicated by arrow 52.

By the lay-down of the ribbon of constituent polymeric film layers on the fibrous web, there is formed a coextrusion laminate 70 which then is passed through the nip defined by adjacently positioned rolls 54 and 60. Roll 54 is a pressure roll which is mounted on axle 56 and driven by suitable drive means (not shown) in the direction indicated by arrow 58. The correspondingly roll paired with pressure roll 54 is a matte finish chill roll 60, which is mounted on axle 62 and driven by suitable drive means (not shown) in the direction indicated by arrow 64. The chill roll has a circumferentially extending outer surface 66 with a matte finish, to facilitate the frictional engagement of such roll with the fibrous web 50 constituting the bottom layer of the three-layer laminate illustratively shown. Passage of the laminate through the nip formed by rolls 54 and 60 functions to effect consolidation of the respective layers in the web and form the product laminate The resulting laminate may be passed to further downstream processing steps, such as cutting of the laminate into predetermined shapes for fabrication of protective apparel garment articles.

The width of the laminate formed in the process system illustratively shown in FIG. 2 may be widely varied, depending on the dimensional characteristics of the coextrusion head 45 and the associated widths of the pressure roll 54 and chill roll 60. In commercial practice, coextruders and pressure and chill rolls may be utilized having widths on the order of from about 60 inches up to about 120 inches or even higher widths.

The feed source polymer material introduced to the coextruder 32 in conduit 44 of the FIG. 2 system may suitably comprise a thermoplastic melt solution of the polymer into which has been dispersed a suitable quantity of an anti-static material, whereby the outer polymeric film layer 48 of the resultingly formed laminate 70 contains the anti-static material.

Concurrently, the feed source polymer material which is introduced to the coextruder 32 in conduit 42 is devoid of any anti-static material content, and forms the polymeric film interlayer which serves as a barrier to prevent the anti-static component from migrating from the outer polymeric film layer to the interface between the intermediate polymeric film layer (interlayer) and the fibrous substrate 50.

The multilayer laminate formed by the process system of FIG. 2 may be of the construction shown in FIG. 1, wherein the fibrous substrate layer 12 is a thermal pattern bonded, spunbonded polypropylene non-woven material having a thickness of the order of 13 mils and a weight of approximately 1.25 oz./yd$^2$. The interlayer 16 may be formed of a polyethylene blend comprising 25% by weight LLDPE and 75% by weight LDPE, such layer being devoid of anti-static material and having a thickness on the order of 0.625 mil. The outer layer 20 of this laminate may be formed of the same polyethylene blend of 25% LLDPE and 75% LDPE, containing 2% by weight, based on the total weight of polyethylene, of Ampact 10053 anti-static material. The thickness of this outer layer 20 may also be on the order of 0.625 mil.

In general, the polymeric film layers 16 and 20 of the laminate should be of minimum thickness for reasons of economy and flexibility, and laminates wherein the polymeric film portion (the polymeric film interlayer and outer layer) has a thickness of between about 1 and 2 mils, e.g., on the order of 1.25 mil, have been usefully employed.

With reference to the laminate-forming process system shown in FIG. 2, it is generally desirable that turbulence in the coextruded films be avoided, since any such turbulence will tend to cause dispersion of the anti-static material from the outer layer feed source material to the interlayer feed source material in the coextruded ribbon, with potential adverse affect on the delamination resistance characteristics of the resulting laminate. Thus, the flows of feed source polymeric material at the nozzle 40 of the coextruder are preferably highly laminar in character, to minimize any deleterious dispersion of anti-static material from the outer layer film to the interlayer film.

With regard to the amount of anti-static material which is desirably incorporated in the outer polymeric film layer of the laminate of the present invention, the same may readily be determined without undue experimentation by those skilled in the art. For example, suitable concentrations of the anti-static material in the outer polymeric film of the laminate material may be readily determined by Anti-Static Charge Dissipation Test NFPA-99 (National Firefighters Protection Association). In this test, a 5,000 volt charge is applied to the anti-static-containing material, and the charge then is allowed to decay to 10% of the initial charge level, with the time for such decay being measured.

When applied to a laminate of the present invention comprising a 13 mil fibrous substrate layer of spunbonded polypropylene non-woven material, and middle and upper layers each of 0.625 mil thickness and 25% LLDPE/75% LDPE composition, with only the outer polymeric film layer containing anti-static material (Ampact 10053 anti-stat at a concentration of 2% by weight, based on the total weight of polyethylene in the film), the Charge Dissipation Test NFPA-99 yielded a 5,000 volt to 500 volt charge diminution in a time of 0.5 seconds, indicative of the superior static charge dissipation capability of the laminate material of the invention.

Alternatively, one may measure the static charge resistivity of the multilayer laminate to determine desirable concentration levels of the anti-static component in the outer polymeric film layer thereof. In general, such resistivity is desirably less than $1 \times 1^{11}$ inch-ohm.

A further advantage of this invention is that the anti-static agent is concentrated in the region of the film nearest the surface of the laminate and, since its effects are manufactured at the film surface, it is more effective in such location. It has also been possible to reduce the concentration of antistatic from 4% to 2% by localizing the antistat in only the outer film layer, thereby lowering the cost of the product.

The features and advantages of the present invention are more fully shown with reference to the following Examples, wherein all parts and percentages are by weight, unless otherwise expressly stated.

EXAMPLE I

Blackburn Delamination Test

In order quantitatively determine the susceptibility of multilayer laminates to delamination between constituent fibrous web and polymeric film layers thereof, a Mullen burst tester (commercially avaiable from B. F. Perkin) was modified by removing its rubber diaphragm and draining the hydraulic fluid from the tester. The tester then was coupled to a pressure reduction valve and source of compressed air. A sample of the laminate to be evaluated then was clamped in the tester with the polymeric film side of the laminate on top. Compressed air then was introduced and the pressure was steadily increased until the polymeric film was blown from the fabric sample (1 inch diameter).

The foregoing test is referred to herein as the Blackburn Delamination Test, and results are measured in pounds per square inch, as the pressure level which resulted in delamination of a polymeric film from an associated substrate to which it has been extrusion laminated.

Evaluation of various samples by the Blackburn Delamination Test revealed that in instances of poor adhesion between the polymeric film and fabric layers, the delamination pressure frequently was less than 1 psi, while good film layer to fabric layer adhesion was characterized by delamination pressures which were as high as 20 psi or even higher.

A correlation was discovered between the delamination properties of the polymeric film/fabric laminate, and the laundering properties of the laminate. In instances where the Blackburn Delamination Test delamination pressure was less than 7 psi, the polymeric film tended to separate from the fiber substrate when the laminate was washed in a conventional washing machine with a 12 pound dummy washload. As a result of this testing, it was concluded that 7 psi is a minimum Blackburn Delamination Test pressure level for laminates having commercial utility.

EXAMPLE II

Pinhole Determination

In order to determine the pinholing of polymeric films which were extrusion laminated to fibrous substrates, samples of low density polyethylene laminates comprising two 0.625 inch layers of LDPE (without any linear low density polyethylene therein) were extrusion laminated to 1.25 oz/yd$^2$ Wayne-Tex Polybond spunbonded polypropylene to provide a laminate with a total thickness of 1.25 mils of polymeric film. This laminate was tested for the presence of pin holes by challenging the film side of the laminate with an isopropanol red dye solution. The dye employed was an FD+C RED NUMBER 40 dye dissolved in isopropanol at a concentration of 1%.

The pin hole test was carried out on a table using the red isopropanol solution and, as an applicator, a windshield cleaner sponge approximately 10 inches wide. The red liquid was poured on a fabric specimen approximately one yard long and full width. In these tests, this full width was 60 inches. The colored isopropanol was spread evenly over the film surface using the applicator. The laminate was allowed to dry for approximately five minutes and then inverted.

The pin hole observation and count was made on a one foot long specimen 60 inches wide selected from the center of the isopropanol red dye solution coated region. The pin holes were reported as number of pin holes per one foot specimen. The number of pin holes typically encountered with laminates not containing linear low density polyethylene were in the range of 20 to >100 pin holes per linear foot of 60 inch wide fabric.

When linear low density polyethylene was blended into the film layer formulations, the number of pin holes was reduced to zero.

To confirm that the pin holes in the non-LLDPE samples were significant in size, the fabrics were tested using the ASTM Test Method 903 for Resistance of Protective Clothing Materials to Penetration of Liquids. The chemicals tested included 50% sodium hydroxide and 70% nitric acid. The challenge chemicals tested immediately penetrated the fabric if pin holes were present.

The same tests, when carried out with a laminate made with a linear low density polyethylene-containing film exhibited no penetration. These ASTM penetration tests were conducted by an independent certifying laboratory, Radian Corporation, 8501 Mo-Pac Boulevard, Austin, Tex.

While the invention has been described with specific reference to illustrative embodiments and specific features, it will be recognized that the utility of the present invention is not thus limited, but rather extends to other modifications, variation, and embodiments which will be readily apparent to those skilled in the art.

What is claimed is:

1. A multilayer laminate, comprising:
   (a) a substrate layer of non-woven material;
   (b) an intermediate layer of polymeric material which is free of anti-static material and which is extrusion laminated to the substrate layer; and
   (c) an outer layer of polyethylene which contains an anti-static material and comprises low density polyethylene and linear low density polyethylene, and which is co-extruded with and extrusion laminated to the intermediate layer of polymeric material.

2. A multilayer laminate according to claim 1, wherein the amount of linear low density polyethylene in the outer layer is sufficient to substantially completely eliminate pinhole formation therein.

3. A multilayer laminate according to claim 1, wherein the amount of linear low density polyethylene in the outer layer is from about 5 to about 50% by weight, based on the total weight of polyethylene therein.

4. A multilayer laminate according to claim 1, wherein the amount of linear low density polyethylene in the outer layer is from about 10 to about 30% by weight, based on the total weight of polyethylene therein.

5. A multilayer laminate according to claim 1, wherein the amount of linear low density polyethylene in the outer layer is from about 10 to about 25% by weight, based on the total weigh of polyethylene therein.

6. A multilayer laminate according to claim 1, wherein the intermediate layer is formed of a material selected from the group consisting of polyethylene, ethylene vinyl alcohol polymers and copolymers, and ethylene vinyl acetate polymers and copolymers.

7. A multilayer laminate according to claim 1, wherein the laminate has a Blackburn Delamination Test value of at least 7 psi.

8. A multilayer laminate according to claim, wherein the substrate layer non-woven material is polypropylene.

9. A multilayer laminate according to claim 1, wherein the substrate layer non-woven material is spunbonded polypropylene.

10. A multilayer laminate according to claim 1, wherein said outer layer is substantially pinhole-free.

11. A multilayer laminate according to claim 1, wherein the intermediate layer is formed of polyethylene.

12. A multilayer laminate according to claim 1, wherein the intermediate layer comprises a blend of low density polyethylene and linear low density polyethylene.

13. A multilayer laminate according to claim 1, wherein the thickness of each of the intermediate and outer layers is from about 0.5 to about 1 mil.

14. A garment comprising a multilayer laminate according to claim 1.

15. A process for making a multilayer laminate, comprising:
   providing a substrate layer of non-woven material;
   coextruding from separate feed source polymeric materials, and extrusion laminating with the substrate layer, polymeric layers including an intermediate layer and an outer polymeric layer, wherein said outer layer comprises a blend of low density polyethylene and linear low density polyethylene; and
   incorporating in said feed source polymeric material for said outer layer an anti-static material, while maintaining said feed source polymeric material for said intermediate layer substantially free of anti-static material.

16. A process according to claim 15, comprising maintaining laminar flow rates of said polymeric melt materials in said coextruding step.

17. A process according to claim 15, wherein said feed source polymeric melt material for said intermediate layer comprises a blend of low density polyethylene and linear low density polyethylene.

18. A process according to claim 15, wherein said substrate layer is a non-woven web.

19. A process according to claim 15, wherein said substrate layer is a non-woven polypropylene web.

20. A process according to claim 15, wherein said substrate is a non-woven spunbonded polypropylene web.

* * * * *

UNITED STATES PATENT AND TRADEMARK OFFICE
CERTIFICATE OF CORRECTION

PATENT NO. : 5,035,941

DATED : July 30, 1991

INVENTOR(S) : William A. Blackburn

It is certified that error appears in the above-identified patent and that said Letters Patent is hereby corrected as shown below:

Column 10, line 17, insert "to" after --order--.

Column 12, line 6, correct "weigh" to read --weight--.

Column 12, line 16, insert "1" after --claim--.

Signed and Sealed this

Twenty-second Day of December, 1992

Attest:

DOUGLAS B. COMER

Attesting Officer

Acting Commissioner of Patents and Trademarks